Feb. 20, 1962   R. A. MAYNE ET AL   3,021,591
METHOD OF MAKING BLOWER ROTOR
Filed Oct. 12, 1953
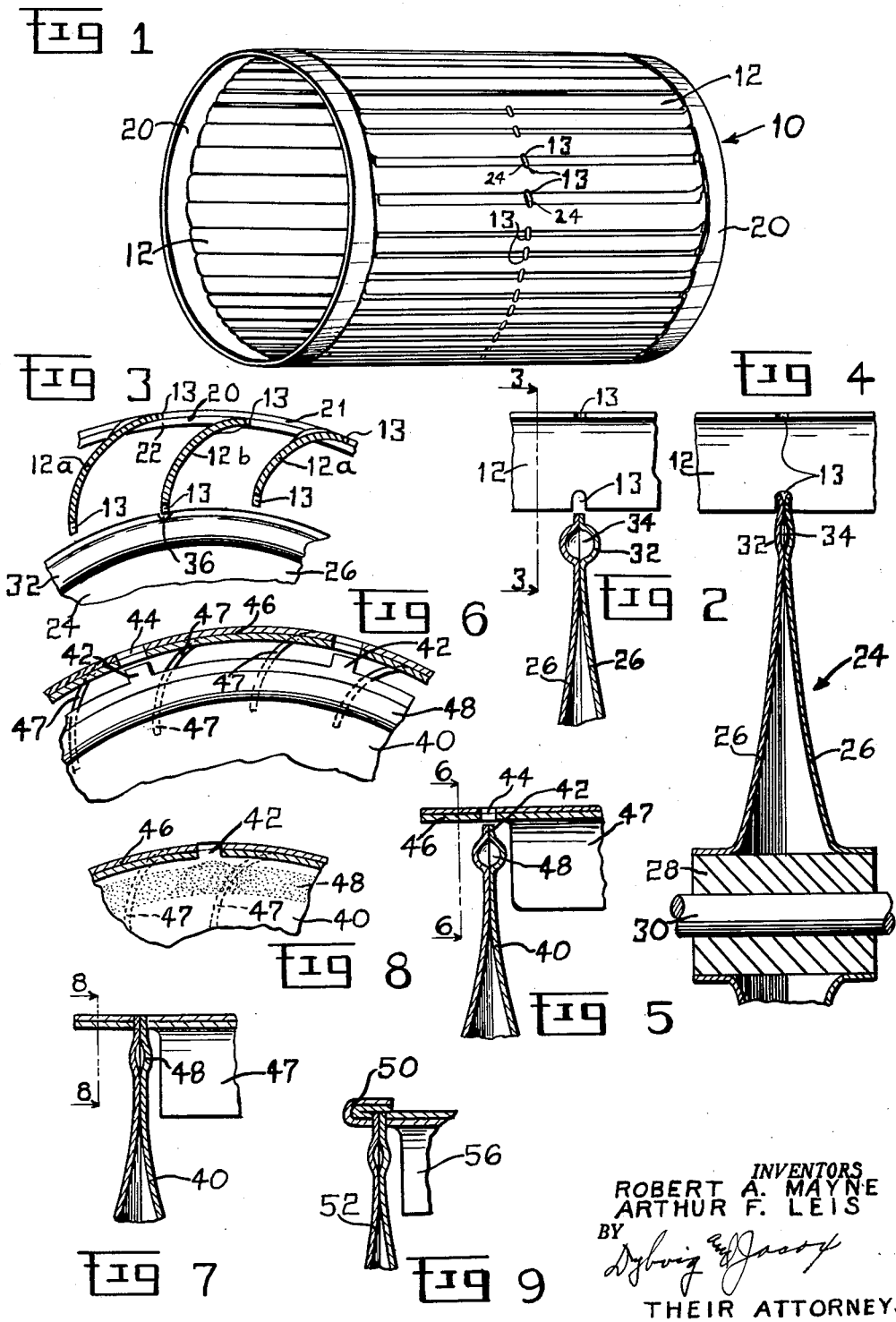
INVENTORS
ROBERT A. MAYNE
ARTHUR F. LEIS
BY
THEIR ATTORNEYS

United States Patent Office 3,021,591
Patented Feb. 20, 1962

3,021,591
METHOD OF MAKING BLOWER ROTOR
Robert A. Mayne, 45 E. Dixon Ave., Dayton, Ohio, and Arthur F. Leis, Dayton, Ohio; said Leis assignor to said Mayne; Ruth D. Mayne, executrix of said Robert A. Mayne, deceased
Filed Oct. 12, 1953, Ser. No. 385,526
14 Claims. (Cl. 29—156.8)

This invention relates to a rotor and to the method of making same. This invention relates particularly to a centrifugal type of blower rotor and to the method of making the rotor, however, the invention is not so limited, in that it may be used in other types of machines and for other purposes.

An object of this invention is to provide a blower rotor comprising a single support wheel attached near the center of the rotor blades.

Another object of the invention is to provide a method of producing a blower rotor having any desired number of support wheels.

Another object of this invention is to provide a simple method of attachment of rotor wheels to the end rings of the rotor blades.

Another object of the invention is to provide a simple and inexpensive method of attachment of a support wheel to a blower blade section.

Another object of this invention is to provide a method of attachment of support wheels to a cylindrical blade section in which no welding or riveting or the like is required.

Other objects and advantages reside in the construction of parts, the combination thereof and the mode of operation, as will become more apparent from the following description.

Referring to the drawings,

FIGURE 1 is a perspective view of a blower rotor provided with a single rotor wheel constructed according to this invention.

FIGURE 2 is a fragmentary side sectional view, disclosing a step in the method of attachment of blower blades of a rotor to a support wheel according to this invention.

FIGURE 3 is a sectional view taken substantially on the line 3—3 of FIGURE 2.

FIGURE 4 is a fragmentary side sectional view showing another step in the method of attachment of the blower blades of a rotor to a support wheel, according to this invention.

FIGURE 5 is a side sectional view showing a step in the attachment of an end rim of a blower rotor to a rotor support wheel, according to this invention.

FIGURE 6 is a sectional view taken substantially on the line 6—6 of FIGURE 5.

FIGURE 7 is a side sectional view, disclosing another step in the attachment of an end rim of a blower rotor to a rotor support wheel, according to this invention.

FIGURE 8 is a sectional view taken substantially on the line 8—8 of FIGURE 7.

FIGURE 9 is a side sectional view disclosing the attachment of a rotor support wheel to another type of rotor end rim, according to this invention.

FIGURE 10 is a fragmentary end view of another modification of a blower rotor of this invention.

In the drawings, reference numeral 10 represents a blower rotor provided with a single support wheel constructed according to this invention. The rotor 10 is provided with a plurality of blades 12 which are formed from a single sheet of metal similar to the manner disclosed in United States Letters Patent No. 2,431,647, issued to joint inventors, one of whom is an applicant in this application. The sheet from which the blades 12 are formed is cut with uniformly spaced transverse incisions extending to points adjacent the two side edges of the sheet.

These transverse incisions form the sheet into strips which are retained by the uncut side edges. Next a longitudinal row of small holes is formed in the sheet near the center thereof, so that each hole is bisected by one of the incisions in the sheet. Thereby, notches or slots 13 are formed in the edges of the strips so as to provide shoulders 13a and 13b, which strips later become blades 12. The holes or slots 13 may be punched first and used as pilot holes for positioning the sheet in proper relation to the cutting tool used in making the transverse incisions. The strips are then bent arcuately and at an angle with respect to the end, thus forming blades 12.

The sheet is then formed into a plurality of convolutions, shown here as two convolutions, so that alternate blades 12a and 12b extend from separate convolutions, as disclosed in FIGURE 3. The uncut edge portions of the sheet, which are formed into convolutions 21 and 22, form end rings 20. Blades 12b extend from convolution 22 and blades 12a extend from convolution 21.

A rotor support wheel 24 comprises two discs or plates 26 attached to a hub 28 through which extends a shaft 30. A protrusion or bead or out-of-plane deformation 32 is formed adjacent the periphery of each of the discs or plates 26. Both of the discs or plates 26 have substantially the same diameter. The two discs 26, as clearly shown in FIGURE 4, converge from the hub 28 until the two discs come in contact with each other at 26a, shown in FIGURES 2 and 4. Immediately beyond the circular contact area 26a, the protrusions 32 are formed, forming a cylindrical tube 34. Beyond this tube portion 34, annular flanges 26b project radially from the tubular portion. The flanges 26b, before collapsing the tube 34 as clearly shown in FIGURE 2, are parallel to each other and contact each other. The converging portions extending outwardly from the hub form a reinforced conic portion giving rigidity to the wheel. When the discs 26 are assembled upon the hub 28 and attached thereto, the protrusions 32 and the discs 26 form a tubular bead 34 in the wheel 24 adjacent the periphery thereof. The wheel 24 is then positioned within the rotor blades approximately at the longitudinal center thereof, so that the outer edge that is, the annular flanges 26b of the wheel 24 are aligned with the slots or notches 13 formed in the blades 12, as best shown in FIGURE 2. The combined thickness of the flanges 26b is less but not must less than the distance between the shoulders 13a and 13b. The protrusions 32 forming nearly right angles with the flanges 26b, and forming the tube 34, are then forced, pressed or squashed one toward the other around the periphery of the wheel 24 by any suitable means; thus, the outside diameter of the wheel 24 becomes greater and the circumferential edges of the wheel move into the notches 13 of the blades 12, as shown in FIGURE 4. FIGURE 4 clearly shows that the circumferential edges of the discs or plates 26 bend and diverge one from the other by spreading or moving axially and outwardly as the tube 34 is collapsed. Thus these circumferential edges of the discs or plates 26 firmly and lockingly engage the blades 12 within the notches 13. The flanges 26 frictionally engage the plates and opposed shoulders 13a and 13b. Due to the fact that the convolution 22 lies within the convolution 21, the blades 12b extend farther toward the center of the wheel 24 a distance substantially equal to the thickness of the metal used in forming the convolution. To compensate for this difference, the edge of the wheel 24 may be formed with notches 36 to receive the blades 12b, as shown in FIGURE 3.

Obviously, the axial or lateral movement of the outer margins of the flanges 26 is limited by the flanges engaging the shoulders 13a and 13b, the edges of the flanges being free to spread axially between adjacent blades without restriction.

The wheel 24 is thus firmly and rigidly secured to the blower blades 12, as disclosed in FIGURE 4. The rotor blades 12, including the end rings 20, are supported by the wheel 24. The shaft 30 may therefore be employed to transmit power to revolve the rotor blades 12. The single wheel 24, positioned intermediate the ends of the rotor blades 12, supports the entire revolving structure.

A preferred modification in the construction of the blower rotor is that of securing a wheel member 40 to each end ring of the blades. As disclosed in FIGURES 5 and 6; the wheel member 40 is provided around its periphery with lugs 42 which are adapted to snugly engage slots 44 of an end ring 46 at each end of blades 47. A tubular bead 48 is formed around the wheel 40 adjacent the outer edge thereof before the wheel is inserted within the end ring 46. This bead has substantially a torroidal configuration. Then the wheel 40 is aligned within the end ring 46, so that the slots 44 of the end ring are aligned with the lugs 42 of the wheel 40. Next, the side portions of the tubular bead 48 are forced one toward the other by any suitable means, causing the side walls of the tubular bead 48 to partially collapse and causing the diameter of the wheel 40 to increase, thus forcing the lugs 42 to move into the slots 44, as shown in FIGURES 7 and 8.

When a wheel, such as wheel 40, is secured to an end ring 46, there is usually no wheel used at the center of the blades, as described with respect to FIGURES 1, 2, 3 and 4. Therefore, it is not necessary to form notches in the blades of the rotor. However, when no wheel is secured at the center of the blades, two wheels are employed and one is secured to each end ring 46 in a method as described with respect to FIGURES 5, 6, 7 and 8.

If it is desired to fold an end ring 50, as shown in FIGURE 9, a support wheel 52 can be secured to the ring 50 at each end of the blades 56 in a manner similar to that described with respect to the wheel 40 and the end ring 46.

Shown in FIGURE 10 is a fragmentary end view of another modification of a blower rotor of this invention. A shaft 60 supports a hub 62. Attached to the hub 62, integrally or in any other suitable manner, are a plurality of spokes 64. There are a plurality of blades 66, some of which are notched and contact the spokes 64. A protuberant bead 67 near the end of each spoke 64 is squeezed to move the end of the spoke into the notch of the blade radially adjacent thereto. The blades 66 are formed from sheet metal convolutions 68 and 70 as described above with respect to convolutions 20 and 21.

Thus, it may be understood that a rotor constructed according to this invention is of simple, inexpensive, rugged construction. No welding or riveting of the rotor wheel to the blades or to the end rings is required. A wheel may be firmly secured at the center or at any other portion of the blades in a simple manner and at low cost.

The method disclosed herein by which a wheel, or a plurality of wheels, is secured within a cylindrical section may be employed in any type of rotor apparatus regardless of whether it is a blower or electrical equipment or any other type of apparatus. The method may be employed whether the cylindrical section is produced by convolutions of a single sheet, or produced by any other method. The method disclosed herein may be employed if the wheel section is composed of disc sections such as shown, or if the wheel is composed of spoked elements. The method disclosed herein may also be employed in the manufacture of other devices not circular or cylindrical in shape. For example, the method disclosed may be employed in the production of any type of support and the attachment of the support to any type of member.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. The method of making a blower rotor having a cylindrical blade section and a support wheel comprising the steps of forming a sheet of metal into a cylindrical body open at each end thereof and having a plurality of blades attached thereto, each blade having an inner edge within the cylinder, the blades being retained between a pair of end rings, some of the blades projecting inwardly further than some of the other blades, followed by forming a notch at the inner edge of the blades projecting inwardly further than the other blades, forming a pair of circular plates, followed by bending an annular protrusion in each plate adjacent the periphery thereof, said circular plates having a limited annular area between the annular protrusions and the peripheral margin of the circular plates, the limited annular area being such that when the annular protrusions are flattened said annular area is deflected, joining the circular plates one to the other in axial alignment forming a support wheel with the protrusion on each circular plate aligned with the protrusion on the other plate thus forming a tubular bead adjacent the periphery of the support wheel, the combined thickness of the circular plates being less than the width of the notch but not much less, placing the support wheel within the cylindrical body with the peripheral edges of the circular plates aligned with the notches in the inner edges of the blades, squeezing the protrusions forming the tubular bead so that the tubular bead becomes smaller in size thus increasing the diameter of the support wheel and thus causing the peripheral edges of the circular plates to move into the notches in the blades, the peripheral limited annular area of each circular plate diverging one from the other during squeezing of the protrusions, the width of the notch being such that the outer margins of said limited annular areas when deflected engage the sides of the notches, thus causing the edges of the circular plates to abuttingly engage the blades in two spaced areas within the notches thereof, thus locking the blade section to the support wheel.

2. The method of constructing a centrifugal blower rotor having a blade section provided with a plurality of elongate blades arranged in circular relation, comprising the steps of forming a slot in the inner edge of the blades, forming a pair of similar disc sections so that each disc section has a protuberance extending around the disc section adjacent the periphery thereof, the center portions of the disc sections converging until contacting each other adjacent the protuberances, the protuberances in the disc sections being in alignment and forming a tubular bead adjacent the periphery of the support wheel the margins of the disc sections beyond the protuberances having marginally and radially disposed blade supporting flanges, positioning the support wheel concentric with the blade section so that the periphery of the support wheel is aligned with the slots formed in the blades, the radial width of the flanges being sufficiently small to allow the flanges to diverge when forcing the protuberances towards each other and the width of the slot being greater than the combined thickness of the discs, the width of the slot being such that the flanges when spread engage the sides of the slots, forcing the protuberances of the disc sections one toward the other, thus substantially eliminating the tubular bead adjacent the periphery of the support wheel, thereby to increase the diameter of the support wheel and spreading the outer margins of the radially disposed flanges so as to press the flanges against the sides of the slots to provide a two area support for each of the blades.

3. The method of constructing a centrifugal blower rotor having a blade section provided with a plurality of elongate blades arranged in circular relation, comprising the steps of forming a slot in the inner edge of the blades, forming a pair of similar disc sections so that each disc section has a protuberance extending around the disc section adjacent the periphery thereof, the protuberances being sufficiently close to the margins of their respective disc sections so that the margins forming flanges will diverge upon the protuberances being flattened, the center portions of the disc sections supporting the protuberances, the protuberances in the disc sections being in alignment and forming a tubular bead adjacent the periphery of the support wheel, the margins of the disc sections having marginally and radially disposed blade supporting flanges, said flanges extending inwardly from the margins to the outer edges of the protuberances, positioning the support wheel concentric with the blade section so that the periphery of the support wheel is aligned with the slots formed in the blades, said slots having a width greater than the combined thickness of the flanges, the width of the slots being such that as the flanges diverge, the flanges contact the sides of the slots, forcing the protuberances of the disc sections one toward the other, thus eliminating the tubular bead adjacent the periphery of the support wheel, thereby increasing the diameter of the support wheel and spreading the outer margins of the radial flanges so as to wedge the flanges into the slots and providing a two area support for each of the slotted blades.

4. The method of constructing a centrifugal blower rotor having a hub section, and a blade section provided with a plurality of blades arranged in circular relation, comprising the steps of forming a pair of shoulders in spaced relation on the inner edges of the blades, forming a plurality of discs, securing a hub to at least one of the discs, forming a protuberance extending around one of the discs so as to form a bead adjacent the periphery thereof, the protuberance being sufficiently close to the margin of its disc to deflect the portion of the disc forming a flange located beyond the protuberance when flattening the same, welding the beaded disc inwardly from said bead to the adjacent disc, the margins of the discs having marginally and radially disposed blade supporting flanges, the distance between the shoulders being greater than the combined thickness of the flanges but not much greater so that the flanges upon being deflected engage the shoulders, positioning the discs concentric with the blade section so that the peripheries of the discs are aligned with the space between the shoulders on the blades, squashing the bead of the beaded disc toward the adjacent disc, thereby to increase the diameter of said beaded disc and to spread the outer margins of said radial flanges so as to press the flanges against opposed shoulders to lock the discs and the blade section into a unitary structure.

5. The method of constructing a centrifugal blower rotor having a hub section, and a blade section provided with a plurality of blades arranged in circular relation, comprising the steps of forming a pair of opposed shoulders on the inner edges of the blades so as to form a slot between the shoulders, forming a pair of discs the combined thickness of the discs being less than the distance between the shoulders, connecting the center portion of at least one of said discs to a hub, forming a tubular head adjacent the periphery of one of said discs, the margin of which one disc provides a radial flange projecting beyond the bead, said bead being sufficiently close to the margin of the disc to deflect the flanges beyond the bead when the bead is squashed, positioning the discs concentric with the blades so that the peripheries of said discs on aligned with the slots formed between the shoulders on the blades, squashing the bead toward the other disc whereby to increase the diameter of the beaded disc, the squashing of the bead moving the outer margin of the radial flange axially so as to cause the outer margins of said discs to spread from each other, said shoulders being sufficiently close together to be abutted by the flanges when spread to firmly lock the disc to the blades.

6. The method of producing a support for a blower wheel adapted to be mounted upon a shaft, said blower wheel having a plurality of inwardly directed blades, said method including the steps of forming a pair of shoulders on the inner margins of the blades, forming a pair of disc members, the combined thickness of the discs being less than the distance between the shoulders but not much less than said distance, forming protuberant beads near the outer margin of the disc members, the beads being sufficiently close to the outer margins of the discs so that the beads upon being squashed deflect the portions of the discs beyond the beads, squashing the beads so as to cause the portions of the sheet metal disc members located beyond the beads to move outwardly radially and to spread axially into engagement with said shoulders on the inner margins of the blades and limited thereby, the edges of the sheet metal disc members being free to spread axially between the blades without restriction.

7. The method of constructing a centrifugal blower rotor having a blade section provided with a plurality of blades arranged in circular relation, and a hub section provided with a plurality of supporting discs, comprising the steps of forming spaced opposed shoulders on said blade section, the combined thickness of the discs being less than but not much less than the distance between the shoulders, deforming portions of the discs a short distance inwardly from the outer margins thereof, positioning said discs in planes between said opposed shoulders, and pressing a pair of said discs to straighten the deformed portions towards each other inwardly of their peripheries to cause their outer peripheral portions to move outwardly between the shoulders to press in opposite directions out of said planes against said opposed shoulders, whereby to lock said blade and hub sections together into a unitary structure.

8. The method of constructing a centrifugal blower rotor having a blade section provided with a plurality of blades arranged in circular relation, and a hub section provided with a plurality of supporting discs, comprising the steps of forming spaced opposed shoulders on said blade section, the distance between the shoulders being greater than but not much greater than the combined thickness of the discs, forming an out-of-plane deformation in one of said discs coaxial therewith and beginning a short distance inwardly of the periphery thereof, positioning said discs in planes between said opposed shoulders, and pressing the deformed part of said one disc axially towards an adjacent disc to cause the peripheral portions of said discs to deflect outwardly between said shoulders and to press axially in opposite directions out of said planes against said opposed shoulders, whereby to lock said blade and hub sections together into a unitary structure.

9. The method of constructing a centrifugal blower rotor having a blade section provided with a plurality of blades arranged in circular relation, and a hub section provided with a plurality of supporting discs, comprising the steps of forming spaced opposed shoulders on said blade section, the distance between the shoulders being greater than but not much greater than the combined thickness of the discs, forming an out-of-plane deformation in one of said discs coaxial therewith and beginning a short distance inwardly of the periphery thereof, positioning said discs in planes between said opposed shoulders, and pressing the deformed part of one disc axially towards an adjacent disc to cause the peripheral portions of said discs to move outwardly between said shoulders and to press axially and outwardly of said planes in opposite directions against said opposed shoulders, whereby to frictionally lock said blade and hub sections together into a unitary structure.

10. The method of constructing a centrifugal blower rotor having a blade section provided with a plurality of blades arranged in circular relation, and a hub section provided with a plurality of supporting discs, comprising the steps of forming spaced opposed shoulders on said blade section, the distance between the shoulders being greater than but not much greater than the combined thickness of the discs, forming an out-of-plane deformation in one of said discs coaxial therewith and beginning a short distance inwardly of the periphery thereof, positioning said discs in planes between said opposed shoulders, and pressing the deformed part of said one disc axially towards an adjacent disc to increase the diameter of said one disc to cause the periphery thereof to move between the shoulders and to press the periphery of said one disc out of said plane so as to cause said discs to press against said opposed shoulders, whereby to lock said blade and hub sections together into a unitary structure.

11. The method of producing a supporting assembly from a pair of sheet metal members having a main body portion for supporting peripheral means extending around the supporting assembly, said peripheral means having spaced shoulders in the inner portion thereof, the distance between the shoulders being greater than the combined thickness of the sheet metal members but not much greater, the size of the sheet metal members being slightly greater than the internal dimensions of the peripheral means, said method including the steps of forming protuberant beads beyond the main body portion and near the margins of the sheet metal members to contract the periphery of the sheet metal members so that the sheet metal members may be inserted within the peripheral means, said beads being sufficiently close to the outer margins of the sheet metal members so that as the beads are flattened the portions beyond the beads are deflected, aligning the sheet metal members between the spaced shoulders of the blades, and flattening the beads so as to cause the portions of the sheet metal members located between the beads and the edges of the sheet metal members to move outwardly between the shoulders and to spread into engagement with the shoulders of the peripheral means to be supported.

12. The method of constructing a centrifugal blower rotor having a hub section, and a blade section provided with a plurality of blades arranged in circular relation, comprising the steps of forming opposed spaced shoulders on the inner edges of at least some of the blades, the blades having spaced shoulders being substantially uniformly spaced throughout the circumference of the blade section, forming a plurality of sheet metal members converging from the center of the hub until coming in contact with each other, the inner diameter of the blade sections being less than but not much less than the maximum dimensions of the sheet metal members, forming a bead extending around said sheet metal members, the bead contracting the sheet metal members to a dimension less than the internal diameter of the blades, the center portions of said sheet metal members supporting the bead, the margins of said sheet metal members having marginally and radially disposed blade supporting flange portions, the flange portions extending from the beads to the outer margins of the sheet metal members, the radial width of the flange portions being such that the flattening of the bead deflects the flange portions into contact with blades having opposed shoulders therein, the contacts being substantially uniformly spaced throughout the circumference of the blade section and being sufficient in number to support the blade section, positioning the sheet metal members concentric with the blade sections and with the peripheries of the sheet metal members axially positioned in planes between said opposed shoulders, the distance between the shoulders being greater than the combined thickness of the sheet metal members, said distance being such that as the flange portions are deflected the flange portions engage the shoulders, squashing the beads of said sheet metal members toward each other, thereby to increase the diameter of said sheet metal members and to spread the outer margins of the radial flange portions of said sheet metal members so as to spread the flange portions of the sheet metal members axially between said opposed shoulders whereby to lock the sheet metal members to said blade sections.

13. A method of forming a fan wheel comprising the steps of forming two discs with concavo-convex beads adjacent their peripheries, positioning the discs with the concave surfaces of the beads facing one another, forming a plurality of blades with inwardly projecting slots therein, positioning the blades around the disc peripheries with the disc edge portions in alignment with the slots, and retaining the blades in fixed positions on the discs while compressing the beads together to force the disc edge portions to diverge from one another and move into the slots.

14. A method of forming a fan wheel comprising the steps of forming two discs with concavo-convex beads adjacent their peripheries, positioning the discs with the concave surfaces of the beads facing one another, forming a plurality of blades with inwardly projecting slots, the sides of the slots being spaced apart a distance greater than the combined thickness of the two discs and within reach of the marginal portions of the discs upon the discs being expanded, positioning the blades around the disc peripheries with the disc edge portions in alignment with the slots, and retaining the blades in fixed positions on the discs while compressing the beads together to force the disc edge portions to diverge one from another and move into the slots and into contact with the sides of the slots.

References Cited in the file of this patent

UNITED STATES PATENTS

| Number | Name | Date |
|---|---|---|
| 504,208 | Fox | Aug. 29, 1893 |
| 900,739 | Jude et al. | Oct. 13, 1908 |
| 903,532 | Anderson | Nov. 10, 1908 |
| 978,036 | Klahn | Dec. 6, 1910 |
| 1,748,452 | Martins | Feb. 25, 1930 |
| 2,125,697 | Swingle et al. | Aug. 2, 1938 |
| 2,181,592 | Sullivan | Nov. 28, 1939 |
| 2,231,063 | Evans | Feb. 11, 1941 |
| 2,240,238 | Baker | Apr. 29, 1941 |
| 2,242,586 | Marbach | May 20, 1941 |
| 2,304,581 | Lyon | Dec. 8, 1942 |
| 2,315,407 | Evans | Mar. 30, 1943 |
| 2,392,113 | Anderson | Jan. 1, 1946 |
| 2,431,647 | Mayne et al. | Nov. 25, 1947 |
| 2,537,805 | Wilken | Jan. 9, 1951 |
| 2,626,741 | Osborne | Jan. 27, 1953 |
| 2,711,285 | Burrowes | June 21, 1955 |
| 2,745,171 | King et al. | May 15, 1956 |

FOREIGN PATENTS

| Number | Country | Date |
|---|---|---|
| 9,240 | Great Britain | 1904 |
| 670,392 | Great Britain | Apr. 16, 1952 |